United States Patent
Weidner et al.

(10) Patent No.: US 11,106,676 B2
(45) Date of Patent: Aug. 31, 2021

(54) FAST OLAP QUERY EXECUTION IN MAIN MEMORY ON LARGE DATA IN A CLUSTER

(71) Applicant: SAP SE, Walldorf (DE)

(72) Inventors: Martin Weidner, Walldorf (DE); Jonathan Dees, Karlsruhe (DE); Peter Sanders, Karlsruhe (DE)

(73) Assignee: SAP SE, Walldorf (DE)

( * ) Notice: Subject to any disclaimer, the term of this patent is extended or adjusted under 35 U.S.C. 154(b) by 944 days.

(21) Appl. No.: 14/581,813

(22) Filed: Dec. 23, 2014

(65) Prior Publication Data

US 2016/0098471 A1    Apr. 7, 2016

Related U.S. Application Data

(60) Provisional application No. 62/059,737, filed on Oct. 3, 2014.

(51) Int. Cl.
*G06F 16/2455* (2019.01)
*G06F 16/2453* (2019.01)

(52) U.S. Cl.
CPC .. *G06F 16/24556* (2019.01); *G06F 16/24532* (2019.01)

(58) Field of Classification Search
CPC .............. G06F 17/30489; G06F 17/30445
See application file for complete search history.

(56) References Cited

U.S. PATENT DOCUMENTS

| | | | |
|---|---|---|---|
| 6,618,729 B1* | 9/2003 | Bhashyam | G06F 17/30324 |
| 2011/0213801 A1* | 9/2011 | He | G06F 17/30489 |
| | | | 707/770 |
| 2011/0302151 A1* | 12/2011 | Abadi | G06F 17/30445 |
| | | | 707/714 |
| 2012/0078980 A1* | 3/2012 | Qiao | G06F 16/24556 |
| | | | 707/812 |
| 2012/0191699 A1* | 7/2012 | George | G06F 17/30486 |
| | | | 707/718 |

OTHER PUBLICATIONS

Plimpton et al. MapReduce in MPI for large-scale Graph Algorithms. Sandia National Laboratories, [retrieved on Nov. 29, 2010]. Retreived from the Internet <URL: http://mapreduce.sandia.gov/pdf/pd 1 .pdf>.*

"InstitutsCluster II User Guide," Steinbuch Centre for Computing, KIT, Tech. Rep., Apr. 2013, v2.06. [Online]. Available: http://www.scc.kit.edu/scc/docs/IC/ug/ugic2.pdf.

Abadi, Daniel J., Samuel R. Madden, and Nabil Hachem. "Column-stores vs. row-stores: How different are they really?." Proceedings of the 2008 ACM SIGMOD international conference on Management of data. ACM, 2008.

(Continued)

*Primary Examiner* — Apu M Mofiz
*Assistant Examiner* — Husam Turki Samara
(74) *Attorney, Agent, or Firm* — Mintz Levin Cohn Ferris Glovsky and Popeo, P.C.

(57) ABSTRACT

Techniques are described for efficient execution of analytical queries on large amounts of data in a parallel database cluster while making maximal use of the available hardware.

15 Claims, 6 Drawing Sheets

(56) References Cited

OTHER PUBLICATIONS

Akal, Fuat, Klemens Böhm, and Hans-Jörg Schek. "OLAP query evaluation in a database cluster: A performance study on intra-query parallelism." East European Conference on Advances in Databases and Information Systems. Springer Berlin Heidelberg, 2002.

Bader, David A., Bernard ME Moret, and Peter Sanders. "Algorithm engineering for parallel computation." Experimental Algorithmics. Springer Berlin Heidelberg, 2002. 1-23.

Cao, Pei, and Zhe Wang. "Efficient top-k query calculation in distributed networks." Proceedings of the twenty-third annual ACM symposium on Principles of distributed computing. ACM, 2004.

Chockler, Gregory V., Idit Keidar, and Roman Vitenberg. "Group communication specifications: a comprehensive study." ACM Computing Surveys (CSUR) 33.4 (2001): 427-469.

Dees, Jonathan, and Peter Sanders. "Efficient many-core query execution in main memory column-stores." Data Engineering (ICDE), 2013 IEEE 29th International Conference on. IEEE, 2013.

DeWitt, David J., and Jim Gray. "Parallel database systems: The future of database processing or a passing fad?." ACM SIGMOD Record 19.4 (1990): 104-112.

DeWitt, David, and Jim Gray. "Parallel database systems: the future of high performance database systems." Communications of the ACM 35.6 (1992): 85-98.

Eavis, Todd, et al. "Parallel OLAP with the Sidera server." Future Generation Computer Systems 26.2 (2010): 259-266.

Fagin, Ronald, Amnon Lotem, and Moni Naor. "Optimal aggregation algorithms for middleware." Journal of computer and system sciences 66.4 (2003): 614-656.

Gao, Bin, et al. "Consistent bipartite graph co-partitioning for star-structured high-order heterogeneous data co-clustering." Proceedings of the eleventh ACM SIGKDD international conference on Knowledge discovery in data mining. ACM, 2005.

Graham, Richard L., Timothy S. Woodall, and Jeffrey M. Squyres. "Open MPI: A flexible high performance MPI." International Conference on Parallel Processing and Applied Mathematics. Springer Berlin Heidelberg, 2005.

Gropp, William, Ewing Lusk, and Anthony Skjellum. Using MPI: portable parallel programming with the message-passing interface. vol. 1. MIT press, 1999.

Henning, John L. "SPEC CPU2006 benchmark descriptions." ACM SIGARCH Computer Architecture News 34.4 (2006): 1-17.

Kemper, Alfons, and Thomas Neumann. "HyPer: A hybrid OLTP &OLAP main memory database system based on virtual memory snapshots." Data Engineering (ICDE), 2011 IEEE 27th International Conference on. IEEE, 2011.

Kennedy, Oliver, Yanif Ahmad, and Christoph Koch. "DBToaster: Agile Views for a Dynamic Data Management System." CIDR. 2011.

Koch, Christoph. "Incremental query evaluation in a ring of databases." Proceedings of the twenty-ninth ACM SIGMOD-SIGACT-SIGART symposium on Principles of database systems. ACM, 2010.

Krikellas, Konstantinos, Stratis D. Viglas, and Marcelo Cintra. "Generating code for holistic query evaluation." Data Engineering (ICDE), 2010 IEEE 26th International Conference on. IEEE, 2010.

Lima, Alexandre AB, Marta Mattoso, and Patrick Valduriez. "Adaptive Virtual Partitioning for OLAP Query Processing in a Database Cluster." SBBD. vol. 4. 2004.

Lima, Alexandre AB, Marta Mattoso, and Patrick Valduriez. "OLAP query processing in a database cluster." European Conference on Parallel Processing. Springer Berlin Heidelberg, 2004.

Neumann, Thomas. "Efficiently compiling efficient query plans for modern hardware." Proceedings of the VLDB Endowment 4.9 (2011): 539-550.

Poess, Meikel, and Chris Floyd. "New TPC benchmarks for decision support and web commerce." ACM Sigmod Record 29.4 (2000): 64-71.

Sanders, Peter, and Jesper Larsson Träff. "The hierarchical factor algorithm for all-to-all communication." European Conference on Parallel Processing. Springer Berlin Heidelberg, 2002.

SPEC. (2013) All SPEC CPU2006 Results Published by SPEC. Accessed on May 17, 2013. [Online]. Available: http://www.spec.org/cpu2006/results/cpu2006.html.

Stöhr, Thomas, Holger Martens, and Erhard Rahm. "Multi-Dimensional Database Allocation for Parallel Data Warehouses." VLDB. vol. 2000. 2000.

TPC. (2012) TPC Benchmark H v2.17.2. [Online]. Available: http://www.tpc.org/tpc_documents_current_versions/pdf/tpc-h_v2.17.2.pdf.

Valduriez, Patrick. "Parallel database systems: open problems and new issues." Distributed and parallel Databases 1.2 (1993): 137-165.

\* cited by examiner

TABLE I: SPEEDUP OF INTRA-NODE PARALLELISM (128 NODES)

| Query | Speedup | Query | Speedup |
|-------|---------|-------|---------|
| 1     | 18.7    | 15    | 3.1     |
| 3     | 5.9     | 18    | 24.2    |
| 4     | 18.1    | 21    | 5.7     |

*FIG. 5*

TABLE II: COMPARATIVE POWER TEST

| Query | $SF = 10\,000$ We in [s] | $SF = 10\,000$ EXASol in [s] | factor | $SF = 30\,000$ in [s] |
|---|---|---|---|---|
| 1 | 0.442 | 10.6 | 24.0 | 0.625 |
| 3 | 0.945 | 6.9 | 7.3 | 2.786 |
| 4 | 0.137 | 1.8 | 13.1 | 0.124 |
| 15 | 1.156 | 10.8 | 9.3 | 3.331 |
| 18 | 0.212 | 10.8 | 50.9 | 0.301 |
| 21 | 1.122 | 30.6 | 27.2 | 2.306 |
| $SPEC_{intrate}$ [27] | 625 | 419 | 0.7 | |
| Nodes | 60 | 60 | 1.0 | 128 |
| Total RAM | 3840 GB | 4320 GB | 1.1 | 8192 GB |

*FIG. 6*

FAST OLAP QUERY EXECUTION IN MAIN MEMORY ON LARGE DATA IN A CLUSTER

CROSS-REFERENCE TO RELATED APPLICATIONS

The current application is related to/claims priority under 35 U.S.C. § 119(e) to U.S. provisional application No. 62/059,737 filed on Oct. 3, 2014, the disclosure of which is incorporated by reference herein.

TECHNICAL FIELD

The subject matter described herein relates generally to data processing, and more specifically to query execution in database systems that include multiple nodes.

BACKGROUND

Main memory column-stores are generally quite efficient for processing analytical queries. However, use of a single machine can result in various restrictions, which can include limiting of processing power and data volume to the number of cores and main memory present on the single machine. To enable the processing of larger data sets, the ability to distribute processing to a cluster of a various number of processing units can be desirable.

SUMMARY

In some aspects of the current subject matter, distributed query execution using message passing in combination with intra-node shared-memory parallelism can be performed very efficiently in a cluster. Techniques for resolving remote data dependency by using efficient communication algorithms are discussed herein. Evaluations of these approaches demonstrate their ability to query large amounts of data with short response times using a cluster of processing nodes and combining sophisticated collective operations, multithreading, and efficient algorithms. For example, clustered SQL query execution with datasets may be implemented with 30,000 GB or even more of uncompressed data in main memory with query running times that are one to two orders of magnitude faster than is achievable using the current state of the art for clustered results evaluated for datasets on the order of 10,000 GB (e.g. approximately a third of the data set scale).

Implementations of the current subject matter can include, but are not limited to, methods consistent with the descriptions provided above as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Using only a single machine in the context of a main memory column store can impose several restrictions. For example, processing power and data volume are bounded to the number of cores and main memory fitting on one tightly coupled system. To enable the processing of larger data sets, switching to a cluster of computing systems can become necessary. The current subject matter includes techniques for efficient execution of analytical SQL queries on large amounts of data in a parallel database cluster while making maximal use of the available hardware. Included approaches can include precompiled query plans for efficient CPU utilization, full parallelization on single nodes and across the cluster, and efficient inter-node communication.

While improving the power of a single machine is usually limited, uses of clustering can provide very efficient solutions at competitive prices. To create a truly scalable cluster system, it can be desirable to remove all potential bottlenecks. In some implementations of the current subject matter, a "shared nothing" system can be advantageous because, for example, even a shared-disk implementation can introduce a bottleneck.

Techniques and algorithms for achieving maximal performance for executing analytical SQL queries in a distributed database cluster are discussed herein. Combination of multiple techniques relevant for performance in one system can be desirable for making maximal use of the available hardware. A shared-nothing system as discussed herein can support large amounts of data that fit into the overall main memory of the cluster system. Using a subset of the analytical queries of the TPC-H benchmark, execution approaches are discussed for use with available hardware, to reach a new improved performance baseline. These execution approaches can advantageously include one or more of efficient single core data processing, full parallelization on a single machine, and efficient distributed execution and communication.

Distributed query execution usually increases the number of query passes. Additional communication steps during query execution are typically required to request data or to transfer data to a remote node for further processing because in a shared-nothing environment, related data often resides on a different node. Most techniques for distributed query execution are orthogonal to the local query execution model. Hence, these techniques can also be applied in different execution models.

Exchanging data between nodes in a cluster requires efficient inter-node communication. In some implementations of the current subject matter, message passing between the nodes can be used for query execution to provide a higher level of abstraction than simple point-to-point communication. The Message Passing Interface standard (MPI) can provide advanced collective operations like gather, (personalized) all-to-all, or reduction. These collective operations can enable efficient and scalable communication between all nodes in the network. Reliance only on point-to-point communication can easily introduce communication bottlenecks as scalable communication algorithms are often non-trivial. Custom data types and reduction functions can also optionally be added to MPI operators to further improve performance.

Early work on cluster query execution for OLAP queries stems from approaches that included analyzing parallel database systems in a "shared nothing" (e.g. no resources, such as memory, storage, network connections, etc., are shared between nodes) environment with data storage on disk without multi-threading having very low performance numbers compared to currently available systems. More recent work has demonstrated implementation of a database cluster by introducing a middleware for coordination of single cluster nodes without a deep integration into the database system itself. In some existing approaches, throughput experiments on 64 nodes have query times similar to those achievable with implementations of the current subject matter, but with a factor of 10,000 less data. Further refinement in existing approaches can be realized by improving load balancing between the nodes and optionally by using indexes instead of scans. Still, the overall performance problem remains and using data replication can create challenges in processing large data sets.

The mentioned solutions do not apply more advanced communication patterns, but it has been shown that such approaches can be required to leverage the full performance of the system. Eavis et al. (e.g. as described in T. Eavis, G. Dimitrov, I. Dimitrov, D. Cueva, A. Lopez, and A. Taleb, "Parallel OLAP with the sidera server," *Future Gener. Comput. Syst.*, vol. 26, no. 2, pp. 259-266, 2010.) developed the prototype Sidera server, which is based on message passing and targets online analytical processing. Neither the synthetic data nor the benchmark queries were specified in detail in the published work, but performance numbers are in the range of seconds for processing an input data set of 1 million rows on 16 nodes. Systems consistent with implementations of the current subject matter can achieve similar runtimes with the same number of nodes processing about 10,000 times more data using complicated TPC-H benchmark queries.

Query processing techniques for use on a single machine can be based on the inventors' previous work (e.g. as described in J. Dees and P. Sanders, "Efficient many-core query execution in main memory column-stores," *ICDE*, pp. 350-361, 2013). A whole execution plan can be translated into a single function performing the query in a data parallel manner using several threads. Compiling several operators into one function is also applied by other database systems (e.g., HyPer). The compilation of several operators into one function allows minimizing intermediate results and often the execution of a query in one single pass. The processed tuples are handed from operator to operator in cache, often even in registers, resulting in very efficient code. While useful methods for generating an execution plan and compiling it into single functions can be based in part on the inventors' previous work, in the current subject matter execution plans can include several passes and communication steps with other nodes during the execution rather than fitting a whole query into a single function that produces the result. The prior work is limited to a single machine and performs TPC-H experiments up to 300 gigabyte of data, which cannot be significantly increased without moving to a cluster.

Implementations of the current subject matter can provide a general approach for distributed query execution in a shared-nothing environment where all nodes are identical and none plays a special role. These assumptions can be important for scalability.

Figure 1:
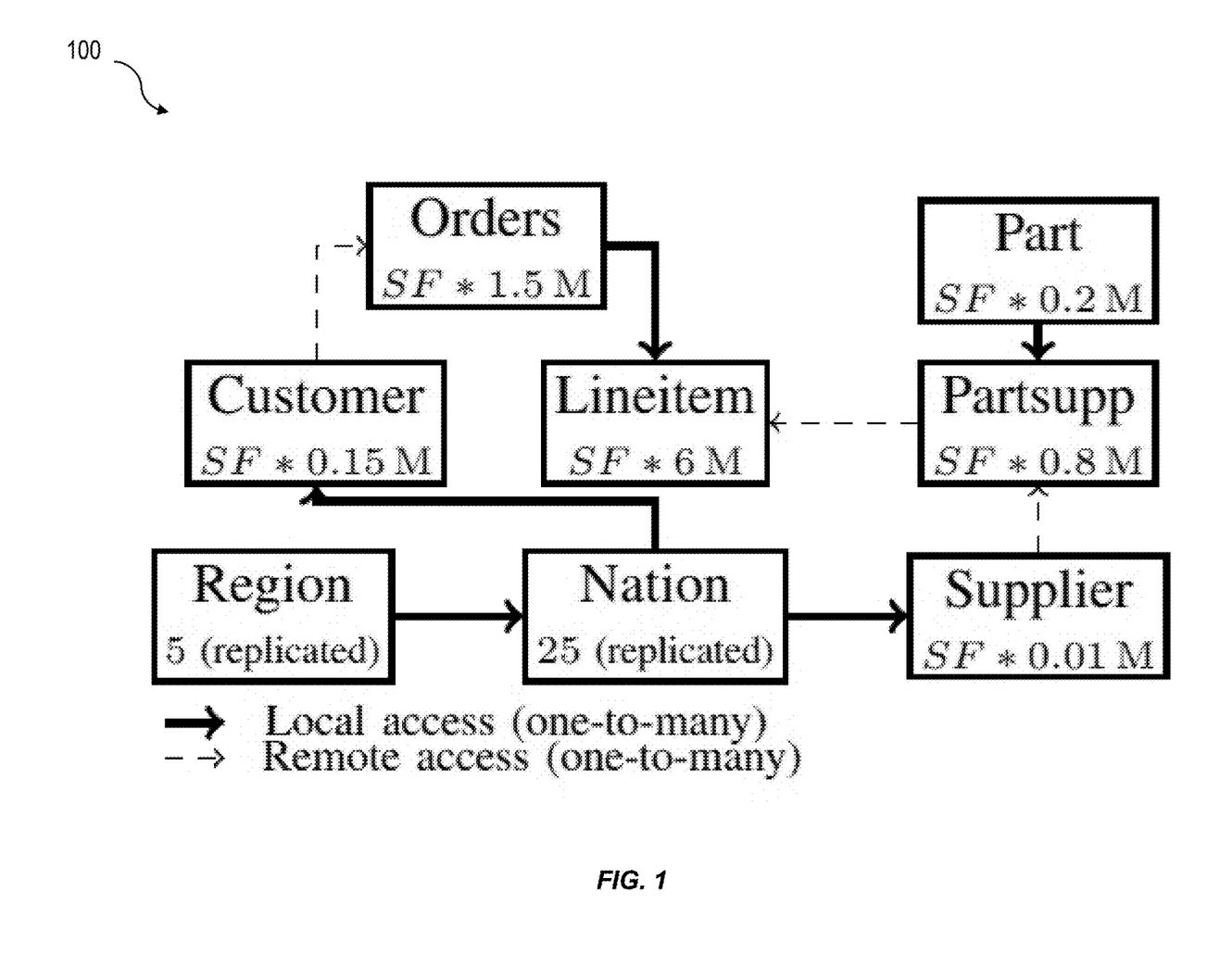
FIG. 1 shows a diagram illustrating database tables specified by TPC-H.

To support full scalability and large database sizes, it can be desirable to minimize or at least reduce replicated data while maximizing or at least increasing the usage of the available main memory. In general, tables can be distributed by partitioning them across the nodes. In cases where a table has a small constant size, it can optionally be replicated across all nodes. As a result, each node holds 1/P of the tuples of each distributed table, where P is the number of nodes. There are three basic partitioning strategies: range-based, round-robin and hashing. Range-based partitioning can be sufficient for synthetic data like in the TPC-H benchmark and which can also simplify data generation. Co-partitioning can also be used, for example for two tables with closely related tuples defined by a foreign key relation, corresponding tuples can be stored in partitions on the same node. With this approach, equi-joins on the foreign key relation can be evaluated locally and additional communication can be avoided. In experiments with the database benchmark TPC-H, for example, co-partitioning was used for the tables lineitem and orders and for part and partsupp. FIG. 1 shows a detailed TPC-H table schema 100 used in a working example of the current subject matter. The schema is extended by a data locality property for foreign key relations. Dashed edges show remote access joins and indicate that the joined tuples can be located in a different partition. Joins on solid edges can be performed locally, thereby avoiding communication costs.

In general, range partitioning can lead to load imbalances, e.g., if a filter predicate qualifies only tuples within a single range of the partitioning key. In a productive system (e.g. a system in productive use by end users at an organization), it can therefore be desirable to instead use hash based partitioning to obtain a reasonable load balance for arbitrary access patterns. With relatively minor modifications, the concepts used here also apply to other partitioning strategies.

Efficient solutions for data exchange consistent with implementations of the current subject matter can include ways to reduce the communication effort, especially for remote join paths. Both general techniques and more specialized solutions can be applied, for example by improving filters on remote attributes, and by exchanging bit-reduced, estimated values.

Intermediate result exchange is an example of an approach consistent with implementations of the current subject matter. Compression can be a general solution for drastically decreasing communication times in cases in which a large amount of intermediate data needs to be exchanged between nodes and can, therefore, have a significant impact on the sequential part of the algorithm. If the data are sorted, delta compression in combination with run length coding, or Golomb coding can provide considerable space reduction. For non-sorted cases, compression algorithms such as LZ4 can be applied. In terms of (de-) compression, it can be desirable to take full advantage of thread parallelism, which leads to higher data throughput and decreases the footprint of compression. For the implementation of TPC-H, specific solutions have been developed to lead to compressed message sizes.

Filtering on remote attributes is another approach that can be employed consistent with implementations of the current subject matter. A specialized solution has been developed for the case that the query graph contains a remote join path and the referenced remote attribute is filtered (e.g. "WHERE x.nation=[nation]", with x as a partitioned relation). In particular, the (remote) join partners that are qualified by the filter predicate should be determined. A trivial solution would be to collect all keys that are required by the join, request them to the remote node, select qualified rows for the join partner and return the result to the sender. In the case that O(|T|) (T: remote table) elements need to be accessed, a more sophisticated solution can be applied. This solution can include applying a semi-join reduction by filtering the remote attribute (join column) and materializing the results within a bitset. Afterwards, the complete bitset is replicated over all nodes (e.g., using the MPI operation all gather). Such an approach can avoid the explicit transmission of required keys and moreover, does not depend on the size of the remote attributes on which the filter operates. When the filter result for each element is materialized, this solution requires |T| bit additional space on each node. In terms of the bitset materialization, the remote input set can be evaluated by using thread-parallelism, which scales linearly with the number of cores and is limited mostly by the memory bandwidth.

Another possible approach consistent with implementations of the current subject matter is a top-k selection on distributed results. A prominent pattern of decision support queries can include aggregating values by key and returning only the top-k results. In a cluster, when the values are spread across the nodes and not partitioned by key, each node only has a partial aggregate of each key. The complete aggregate of each key is found by aggregating the partial results from all nodes. One naïve solution for this problem is to compute all complete aggregate results from the partial results and determine the top-k results afterwards. However, in the case of many keys and small k, the communication overhead for this operation can be very high compared to the final result size. Previous work has focused on solving this problem efficiently, for example using the threshold algorithm described by Fagin et al. (R. Fagin, A. Lotem, and M. Naor, "Optimal aggregation algorithms for middleware," in Proc. of *PODS. ACM*, 2001, pp. 102-113) or TPUT described by Cao et al. (P. Cao and Z. Wang, "Efficient top-k query calculation in distributed networks," in *Proc. of PODC. ACM*, 2004, pp. 206-215). Unfortunately, these algorithms do not perform well with aggregation functions (e.g. SUM) when the same independent value distribution of the partial sums occurs across the nodes. In this case, the final aggregated sums follow a normal distribution and both algorithms communicate almost all partial sums before selecting the top-k.

A new distributed algorithm can be used in some implementations of the current subject matter and can communicate only several bits of all partial aggregation functions. Full values are only communicated for a small set of top-k candidates. In this approach, each partial aggregation function result can be approximated by only m bits of the number. To skip leading zeros, the m bits begin at an offset, which is shared by a group of keys (e.g., 1024). The offset is equal to the position of the highest one-bit of all numbers within the group. These m bits are only an approximation of the values as lower bits are missing. Still, it is possible to compute a maximal and minimal error (all lower bits are one and zero, respectively). Each node is now responsible for a range of keys, which are distributed by a personalized all-to-all message such that each node receives all encoded sums for its key-range. A lower and upper bound are computed for each decoded partial sum and summed up by key, thereby resulting in an upper and lower bound for the total sum per key. A collective reduce operation determines the global k-th highest lower bound. Each key with an upper bound below the k-th highest lower bound cannot be part of the top-k results anymore and is, therefore, discarded. After that, each node requests the full partial sums for its remaining keys, which is expected to be a small set. Then, the k-th highest total sums are determined across the nodes.

Using a larger number for the number of bits m increases the message size in the first step but also improves the lower and upper bound afterwards. In the experiments discussed in greater detail below, this algorithm was applied in query 15 of the TPC-H benchmark and resulted in reducing the communicated data volume by a factor of 8 compared to the naïve solution.

Figure 2:
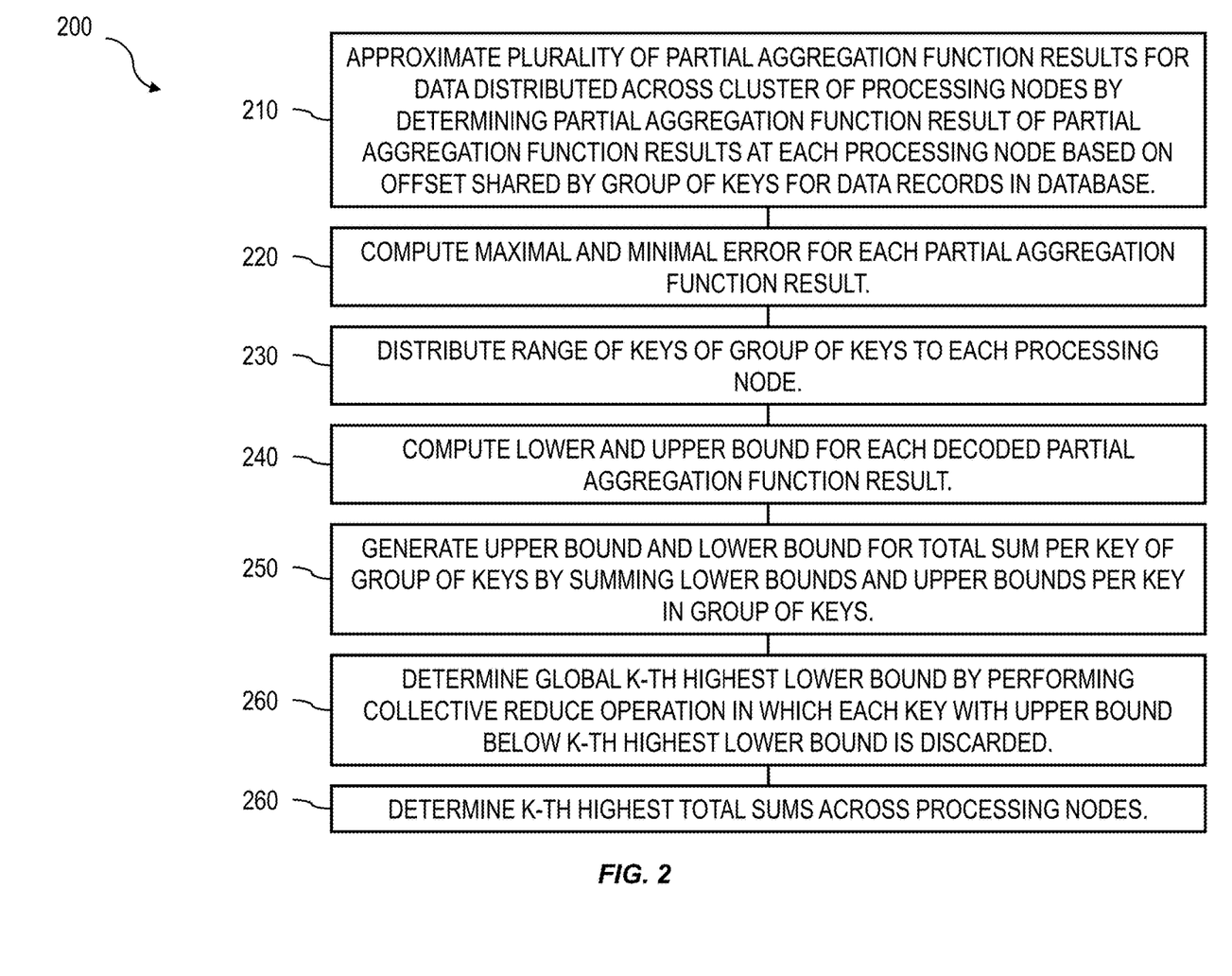
FIG. 2 shows a process flow chart illustrating features of a method consistent with implementations of the current subject matter.

FIG. 2 shows a process flow chart 200 illustrating features that can be included in a method consistent with implementations of the current subject matter. At 210, a plurality of partial aggregation function results for data distributed across a cluster of processing nodes is approximated. The cluster of processing nodes includes a plurality of computing systems, each storing a subset of data in a database. The approximating includes determining a partial aggregation function result of the partial aggregation function results at each processing node based on an offset shared by a group of keys for data records in the database. The offset (m) is equal to a position of a highest one-bit of all numbers within the group.

A maximal and a minimal error is computed at 220 for each partial aggregation function result. This maximal and a minimal error computation can occur at the individual processing nodes. At 230, a range of keys of the group of keys is distributed to each processing node. The distributing includes each processing node receiving all encoded sums for its respective range of keys and being responsible for that respective range of keys. A lower and an upper bound for each decoded partial aggregation function result is computed at 240, and an upper bound and a lower bound for a total sum per key of the group of keys is generated at 250. The generating includes summing the lower bounds and upper bounds per key in the group of keys. A global k-th highest lower bound is determined at 260, and includes performing a collective reduce operation in which each key with an upper bound below the k-th highest lower bound is discarded. At 270, k-th highest total sums are determined across the processing nodes.

Late materialization is still another approach that can be used consistent with implementations of the current subject matter. Analytical query results often consist only of a small number of rows as the answer should remain human-readable. Actually, this is true for all 22 query results of the TPC-H benchmark and usually achieved by small group-by cardinalities or selecting only the top k results. Consequently, the gathering of secondary attributes in the result set that are not involved in the actual query computation (e.g. in TPC-H query 15: s_name, s_address, s_phone) can be delayed. In this manner, the secondary attributes do not slow down the main query computation. When the final result is collected on a single node, the attributes can be requested by one collective scatter operator and received by a collective gather operation both in O(log P) steps, where P is the number of processors.

The TPC-H benchmark is used to measure the performance of database systems for decision support (OLAP) queries. The data generator is defined by the benchmark for checking the query results for correctness without changing the ordering of the rows in the tables. Each table is split into P (number of nodes) chunks and any chunk i is generated directly in main memory on a node with rank i using the following dbgen parameters: −s (SF)−S (rank)−C (P). Only the tables NATION and REGION with both at most 25 rows are not split and replicated across all nodes. Six out of 22 TPC-H queries covering several aspects like filtering, small and large aggregations, and different join types were implemented. A detailed description of the queries is provided below.

To allow fair comparison with other systems, the experiments conducted to test the current subject matter comply with the official TPC-H rules as far as possible. In particular, rules for sorting relations, data structures, and join indexes, which are created transparently between all foreign keys, were followed.

A hybrid parallelization approach was used for the implementation combining inter-node and intra-node parallelism. For the inter-node parallelism the open standard MPI (message passing interface), which provides collective communication operations for remote data exchange, was used. The MPI implementation used was Open MPI, an open source implementation of the MPI specification. The collective operations used by the algorithms discussed herein are gather (collecting a message from each node at root), scatter (send a message to each node from root), all-to-all (every node exchanges a message with every node), and reduce (every node has a message, all messages are the same size, and an operator is applied when joining two messages). Moreover, user-defined reduce operators were developed for an efficient result aggregation as well as customized MPI data types.

Besides MPI, intra-node parallelism based on shared-memory is realized by using TBB (Intel Threading Building Blocks), a template library for C++ that offers an abstraction of thread management. In general, data-parallelism can be applied and the input can be logically partitioned into several parts for processing using "parallel for" and "parallel reduce" of the TBB framework, providing work stealing and load balancing between the threads. In this manner, full advantage of the available intra-node parallelism can be taken.

For the experiments conducted to evaluate performance of approaches consistent with implementations of the current subject matter, queries 1, 3, 4, 15, 18 and 21 were selected from the 22 TPC-H queries with the objective to cover various challenges and access patterns for distributed execution. Query 1 performs a large aggregation and accesses only a single table, providing the top ten unshipped orders based on the potential revenue per order. It is the most used query in related work. Query 4 refers to two co-partitioned tables. It counts per order priority (5 distinct values) the number of orders, and contains delayed lineitems to estimate the effectiveness of the order priority system. Query 18 also uses two co-partitioned tables but also accesses remote attributes for the result output. It determines the top-100 customers based on the property of having placed a large quantity order. The remaining queries have significant remote data dependencies, which means that join partners can be stored on a different partition. Query 3 uses two fact tables and one remote attribute as filters to provide the top ten unshipped orders based on the potential revenue per order. The remote dependency was resolved using the solution of Section III-B2, where a filter is evaluated on a join attribute to qualify customers by their market segment. Query 15 uses one fact table and remote attributes for result output. It produces a large intermediate set of partial results (grouped by a remote key) where only the top-1 element is to be found. Consequently, the top-k selection algorithm described above was used with value approximation to determine the maximum element. Query 21 is similar to query 15 but additionally applies a remote filter during aggregation. It lists those suppliers of a specified nation who were part of a multisupplier order where they were the only supplier delaying the order.

Evaluations of the combination of a clustered query execution using message passing for the inter-node communication with shared-memory parallelism on each node and highly optimized algorithms are provided here. In this context, all tables (except extremely small tables with ≤50 rows) are range-partitioned without table replication. For query 3 and 21, the behavior if the remote join attribute is replicated is also evaluated.

Running time and scalability of the implemented queries were measured to evaluate performance. In this context, weakly scaled factors are used to linearly scale up the input size with the number of computation nodes. This approach simulates the case of an end user who wants to run distributed queries on a growing database. The configurations for {#nodes, scale factor} were {2i; 100·2i} for i=0 . . . 7. At first, the nodes were synchronized with a barrier before each query run. Second, the walltime (e.g. the total real world time elapsed) was measured for the complete query execution. The walltime is used because communication times are hidden from the local CPU time but should be considered in the measures. Third, in order to get an accumulated communication time per query, the running time of occurring MPI communication operations was tracked. In detail, the walltime values of each node were aggregated on the root node to determine the mean running time over all nodes. Additionally, specific checkpoints were tracked by using the CPU time. Those detailed measures allow the evaluation of shared-memory parallelism on multi-cores.

For the experiments described herein, the high performance cluster InstitutsCluster II (IC2) from the Karlsruhe Institute of Technology (KIT) was used. The cluster is used for scientific computations and benchmarks to run shared-nothing parallel programs on up to 128 exclusive nodes per user. The IC2 is configured with an InfiniBand 4× QDR for interconnecting the 16-core Intel Xeon nodes with 64 GB main memory per node. Moreover, each node consists of two E5-2670 Intel Xeon octa-cores with 2.6 GHz, 8×256 KB L2, 20 MB L3. According to the manual, the point-to-point network bandwidth is more than 3700 MB/S with a latency about 1 ms. Microbench-marks were run to measure the real throughput, (a) using explicit send/receive (between two nodes 3 480 MB/S) and (b) using a personalized all-to-all (between 2-8 nodes≈3 000 MB/S, P≥16: <2 400 MB/S in Open MPI v1.6.3). The experienced throughput is, therefore, lower than promised. This observation is important because only collective operations were used for inter-node synchronization, such as all-to-all. The cluster (thin nodes) allows a theoretical maximum main-memory usage of 8 TB, as specified in the user manual. A Suse Linux Enterprise (SLES) 11 runs on every node. The implementation used for experimental testing included GCC 4.7.2 (optimization level-O3) and used Open MPI 1.6.3 as message passing library.

Figure 3:
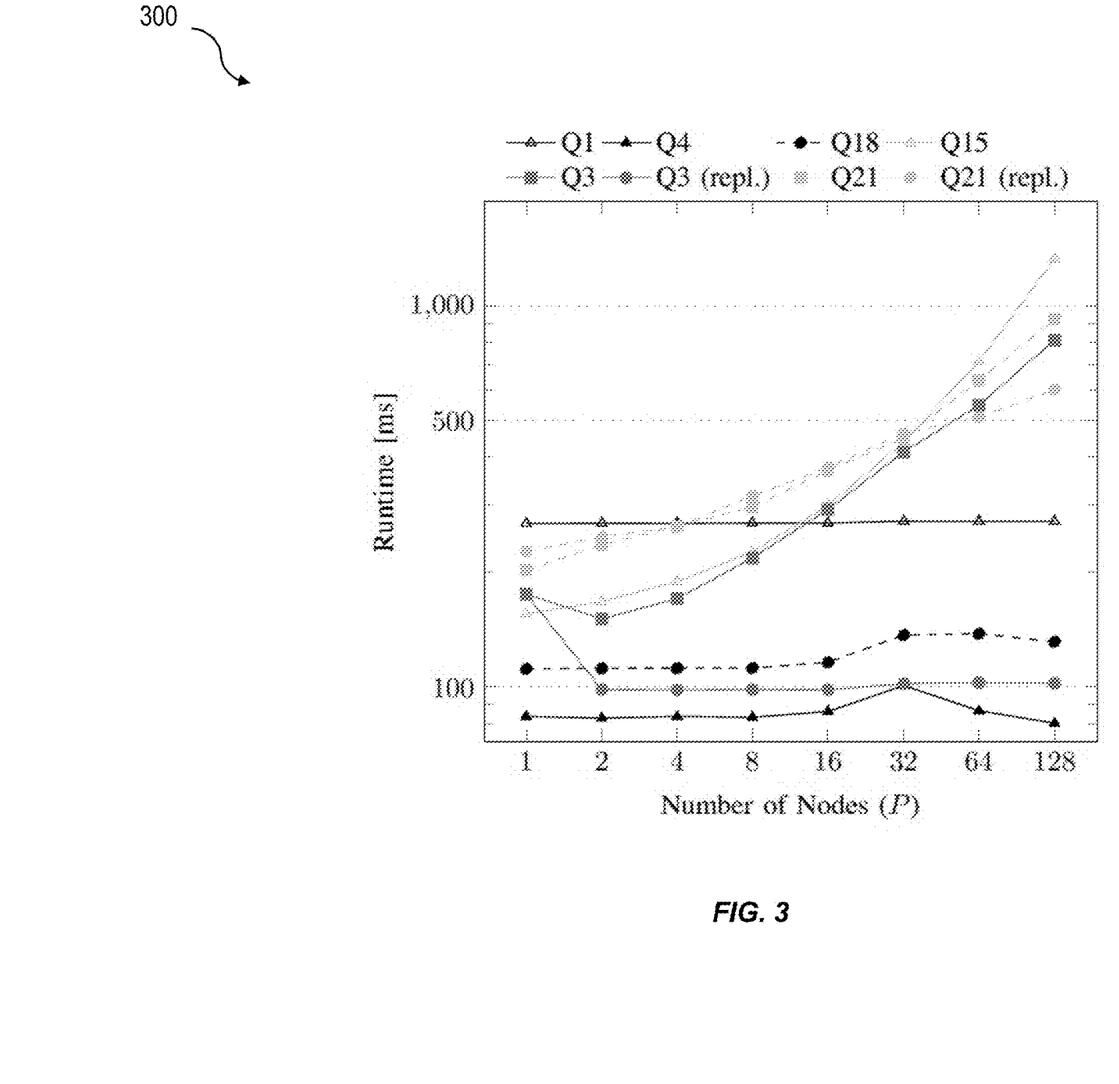
FIG. 3 shows a graph illustrating experimental results.

FIG. 3 shows a graph 300 illustrating the results of a first experiment and contains the plotted running times for weakly scaled factors. Queries 1, 4 and 18 only require data during the aggregation, which are available on the node's partition. In this context, a constant running time in the weak scaling experiment was expected. As evident from FIG. 3, the running times were nearly constant. The maximum scale factor of the experiment was 12,800 on 128 nodes. In the experiment, the queries 4 and 18 required around 80-130 ms, whereas query 1 requires ≈270 ms for execution.

A challenge for queries with join paths to tuples on a non-local partition (queries 3, 15, 21) can be the reduction of intermediate communications. Those communications represent an inherent sequential part of the query execution and moreover, the message sizes depend on the scale factor. Therefore, it is desirable to keep them small enough to gain good scale up characteristics in order to increase the number of nodes (P) for growing hardware and computation demands. The running times for weakly scaled factors should increase for larger P because of an increased communication effort for joining or redistributing intermediate sub-query results. On the one side, the table sizes grow, on the other side, more nodes take part in the collective communication. In this context, the communication complexity for an all-to-all MPI communication (every node exchanges a message with any other node) was in O(P) communication steps, whereas the operations gather (collect a message from every node at root), scatter (send a message to every node from root) and reduce (collect a message from every node at root, apply an operator in each step) were in O(log P), assuming a binary reduction tree. The experimental results match these expectations.

As can be seen in FIG. 3, the running times of query 3, 15 and 21 (without replication) increased with P and its corresponding scale factor. Nevertheless, the running time did not double for a doubled input size and factor two more nodes. For example, the execution of query 15 took four times longer on 64 nodes than on one node, although the amount of processed data was 64 times higher. The observed increasing running time can be explained with an increasing communication effort since the number of communicated elements doubled for each step on the x-axis.

For query 3 and 21, a filter attribute was evaluated in the first step within a sub-query. The intermediate result size depends linearly on the scale factor and thus the running time increased. In a second sub-query, the redistributed intermediate results were joined during the actual aggregation. In this context, the increasing running time for query 3 and a part of the increased running time for query 21 were expected with growing communication costs because of a doubled intermediate result size for a doubled scale factor. An alternative implementation of query 3 and 21 was also performed where the remote join attribute was replicated to get rid of the remote dependency. Here, the applied strategy for query 3 resulted in constant running time. This improvement was gained as with the replication only one collective reduce communication with a fixed-size result set took place to collect the final results.

In contrast to query 3, query 21 scaled worse and did not provide constant running times if the join attribute was replicated. This effect can be explained by a second remote dependency, namely the remote group-by key of the aggregation. Tuples consisting of group-by key and partial aggregate were merged and aggregated by using a custom reduce operator. The number of partial results increased with the scale factor and, therefore, this operation clearly dominated the running time for larger P. The above-described top-k was not applied for query 21 because the integer words of the partial sums are very small.

FIG. 3 shows the running times for query 15 using the above-described top-k value approximation algorithm. Because of weakly-scaled factors, the number of intermediate results doubles in every step and leads to a growing query running time. The algorithm was evaluated more precisely by comparing three different implementations of query 15. The following variants were implemented: a simple implementation which communicates the full values (64 bit required for each) of all partial sums using the library-provided all-to-all algorithm; a simple implementation similar to 1) but using the 1-factor algorithm; and an implementation which uses the top-k solution with approximated values (8 bit approximation).

A weak performance was experienced for the library algorithm all-to-all (Open MPI v1.6.3) and therefore, the 1-factor algorithm with non-blocking send and receive calls was also implemented.

Figure 4:
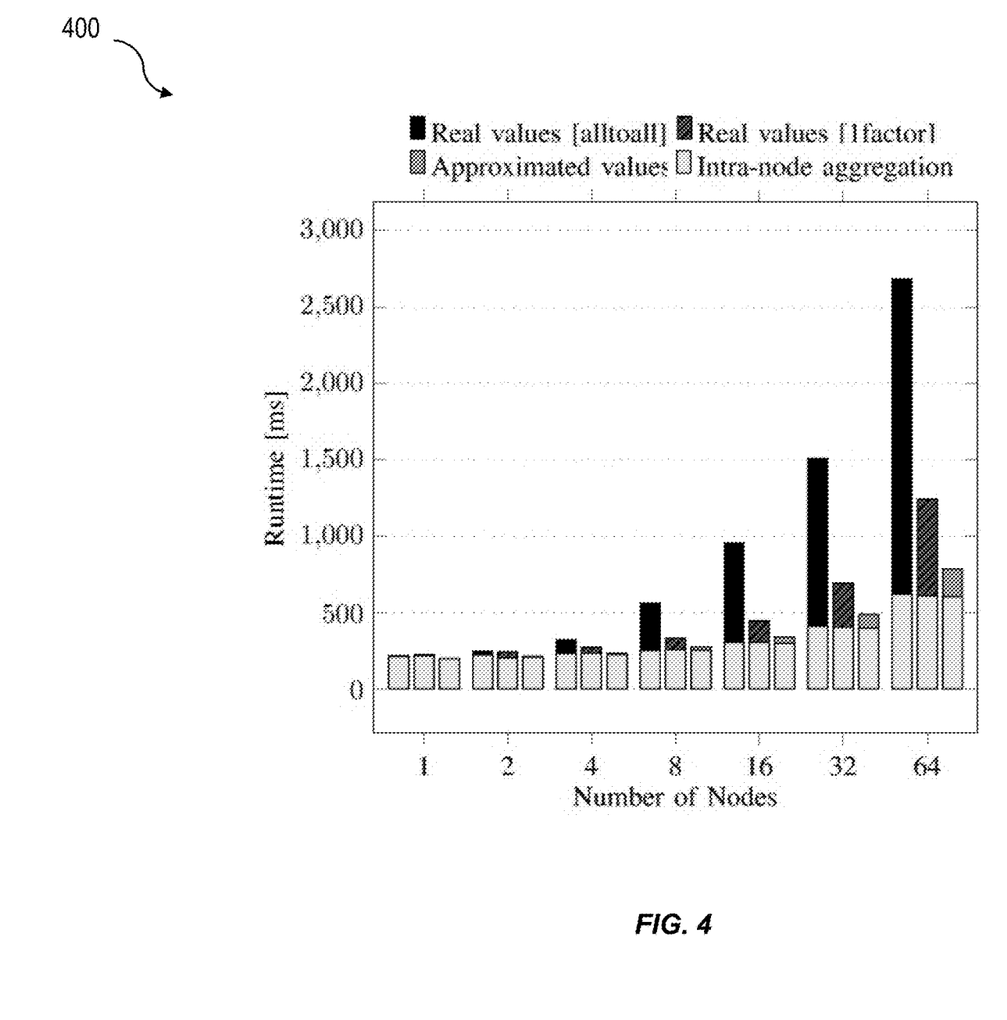
FIG. 4 shows a graph illustrating real and approximated vales for SF=100×P.

The results of experiments with a weakly scaled factor (SF=100·P) can be seen in the graph 400 of FIG. 4, where all three bars are clustered and relate to the same number of nodes. A bar represents either the simple solution (every first two bars, black with MPI all-to-all and dark gray with 1-factor) or the implemented top-k algorithm with value approximation (every third bar, gray). Light gray parts identify the time used for the local aggregation and they are expected to be equal among the three experiments.

First, the 1-factor implementation requires less communication time for the same amount of data as the library-provided all-to-all algorithm for P>2. Second, the simple variants were compared with the top-k algorithm. Lower running times were predicted for the approximative algorithm (gray bar) due to a factor 8 less data to be exchanged—compared to exchanging the real values (64 bit keys originally, 8 bit for encoded values). For better comparison, the 1-factor algorithm was also used to exchange the encoded values. The overhead of encoding and decoding the partial sums requires computation time as well, but this was parallelized using multi-threading. Moreover, the intra-node throughput with 14 GB/S for encoding and 4 GB/S for decoding (the decoding includes the required aggregation of partial sums per key) are higher than the specified point-to-point network throughput of 3700 MB/S. The prediction for the top-k algorithm with partial results approximation was correct by observing speedups up to 2.3 over the simple approach (with 1-factor).

Figure 5:
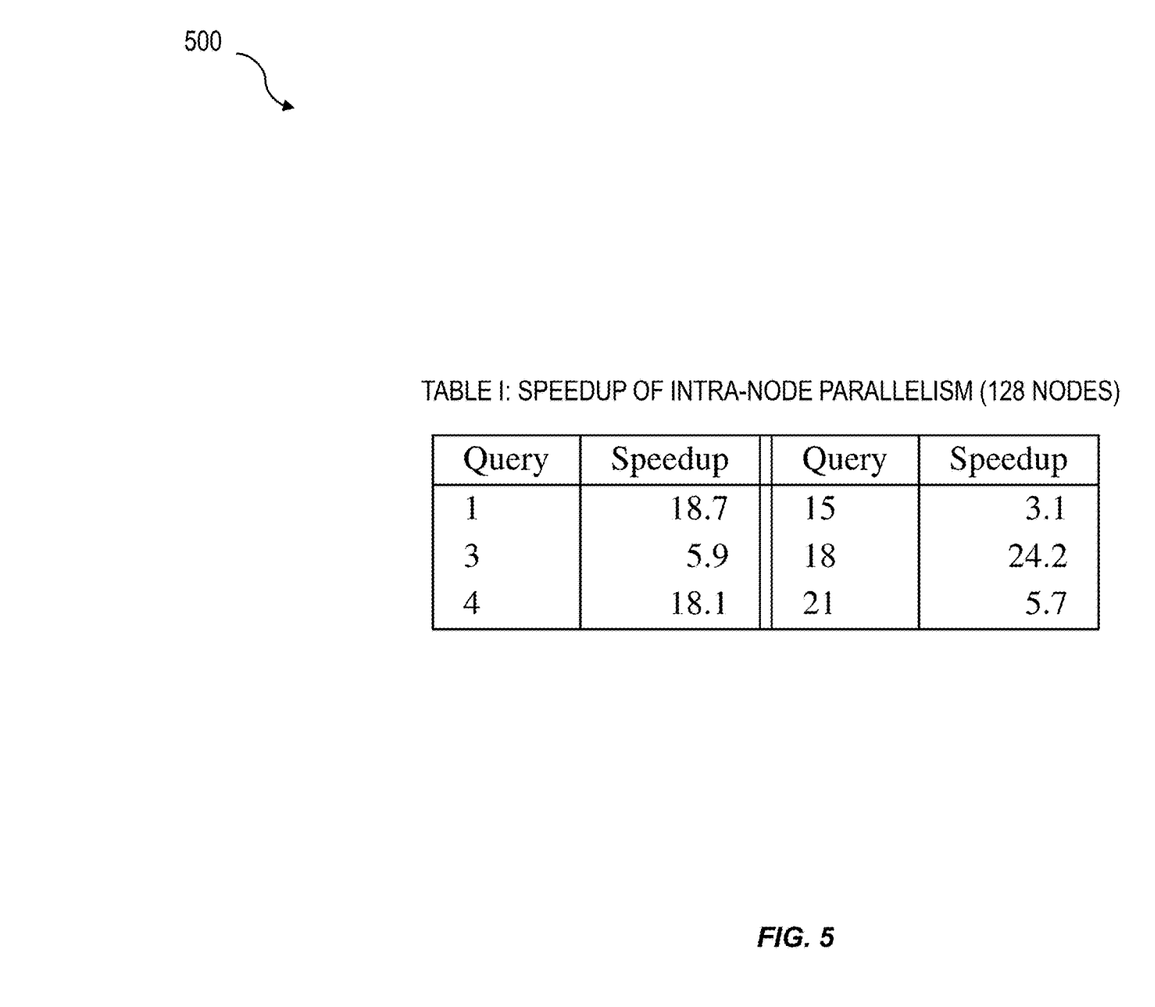
FIG. 5 shows a first table.

A further experiment allows evaluating the effect of intra-node parallelism on query running times. Note that each cluster node contains 16 physical cores and Hyper-Threading is enabled. Weakly-scaled factors were used and the queries were run on 128 nodes. Next, the relative speedups of the weakly-scaled experiments with enabled multi-threading over the single-threaded running times were calculated for each query. The speedups are visible in Table I 500, shown in FIG. 5. They range between factor 5.7 for query 21 and 24.2 for query 18. In addition, the experiment was run on {1, 2, 4, . . . , 64} nodes with similar or better speedups as for 128 nodes. It can be seen, that intra-node parallelism strongly affects running times. Therefore, it is desirable to fully exploit multi-threading.

An additional test series was executed with SF=10,000 on 60 nodes and with SF=30,000 on 128 nodes in order to compare results to the current TPC-H record holder. However, for scale factors larger than SF=10,000 there are no clustered results available any more. There is only one non-clustered result using a single machine installation with SF=30,000. Here, a direct comparison is of limited value due to the different hardware (their runtime for, e.g., query 1 is slower by a factor of more than 4000).

Figure 6:
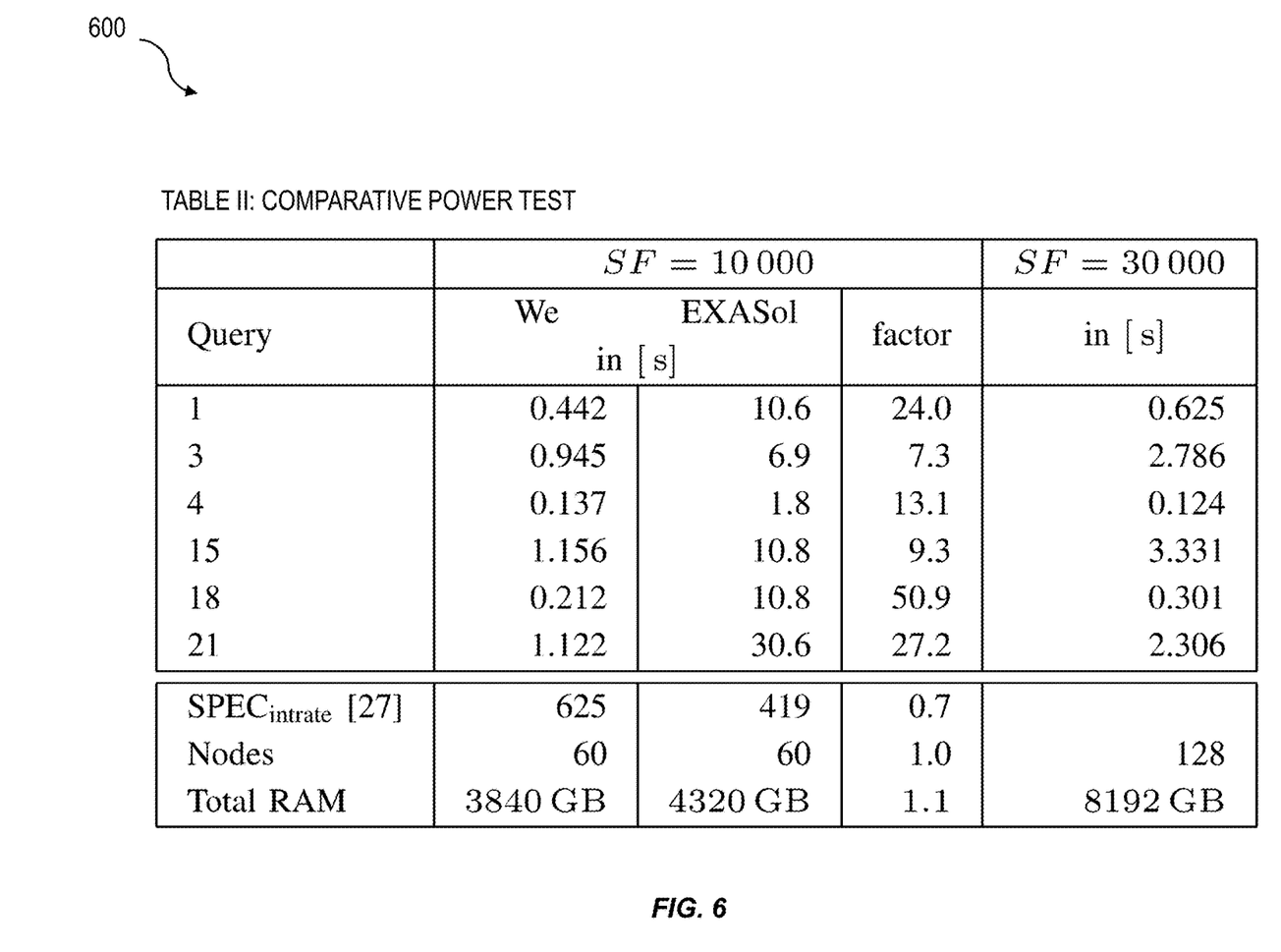
FIG. 6 shows a second table.

For SF=10,000 several clustered results exist. The current record holder is EXASolution 4.0 on a Dell Power Edge R710 with 60 nodes. Each node has 72 GB RAM and they use two Intel Xeon X5690 QC 3.46 GHz, each chip with six cores. As the cluster tested herein uses different machines (Xeon E52670), SPECintrate numbers of the SPEC 2006 benchmark were provided for comparison. Both systems contain 60 nodes. The total RAM of the EXASol cluster is 4320 GB whereas the cluster tested herein has 3840 GB of RAM available. The interconnection between the nodes is realized by an InfiniBand 4× QDR network, which is the same as in the tested cluster. The results are provided in FIG. 6, which shows Table II 600, indicating for each query the running time, the running time of EXASol, and the factor by which the implementations consistent with the current subject matter are faster than the competitor. As can be seen, the running times of the current implementation are better by a factor of 7 to 50.

Performing just-in-time compilation of SQL queries into native code is possible. For clustered query execution, it can be desirable to extend such a compiler in order to automatically generate distributed plans for a given SQL query. For larger systems with thousands of nodes, fault tolerance will become important because node failures and other errors will be common place. The challenge here is to introduce some redundancy without excessive cost. As an example of such an approach, a query can be translated into native code (e.g. native c-code), which can be optimized for inter-node parallelism. The compiled native code can be compiled to a binary module and executed, so that it takes full advantage of parallelism within one core (multiple pipelines, vectorization, . . . ), as well as intra-node parallelism and inter-node parallelism.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on,"

above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A non-transitory computer program product comprising a machine-readable medium storing instructions that, when executed by at least one programmable processor, cause the at least one programmable processor to perform operations comprising:

performing a top-k aggregation operation on data stored across a cluster of processing nodes, the data including a plurality of values, the top-k aggregation operation being performed to identify a subset of values in the plurality of values, the subset of values including a k quantity of values, each of the k quantity of values being greater than values from the plurality of values that are not included in the subset of values, the cluster of processing nodes comprising a plurality of computing systems associated with a database, each processing node in the cluster of processing nodes being responsible for a range of keys from a group of keys, the range of keys corresponding to a subset of data stored at each processing node, and the performance of the top-k aggregation operation comprising:

receiving, from each processing node, an approximation of each of a plurality of partial aggregation function results for data distributed across the cluster of processing nodes, the approximation of each of the plurality of partial aggregation function results comprising a lesser quantity of bits than a full value of each of the plurality of partial aggregation function results, the approximation of each of the plurality of partial aggregation function results being based on an offset shared by the group of keys for data records in the database, and the approximation of each of the plurality of partial aggregation function results being associated with a maximal error and a minimal error;

distributing, to each processing node, a global k-th highest lower bound, the global k-th highest lower bound determined by at least:

computing a lower bound and an upper bound for the approximation of each of the plurality of partial aggregation function results, and generating an upper bound and a lower bound for a total sum per key of the group of keys, the generating comprising summing the lower bound and the upper bound for the approximation of each of the plurality of partial aggregation function results;

receiving, from each processing node, a full value for each of a plurality of top-k candidates, the plurality of top-k candidates being determined by at least performing, at each processing node, a reduce operation based on the global k-th highest lower bound, the performance of the reduce operation comprising discarding keys having an upper bound below the global k-th highest lower bound; and returning a result comprising the k quantity of values, the result being determined based on the full value for each of the plurality of top-k candidates.

2. A computer program product as in claim 1, wherein each partial aggregation function result is approximated by an m number of bits, and wherein the m number of bits begin at the offset.

3. A computer program product as in claim 1, wherein the offset is equal to a position of a highest one-bit of all numbers within the group.

4. A computer program product as in claim 1, wherein the operations further comprise distributing the range of keys for each processing node to the other processing nodes via personalized all-to-all messages such that each processing node receives all encoded sums for its range of keys.

5. A computer program product as in claim 1, wherein the operations further comprise:

translating a query into native code, the native code being optimized for inter-node parallelism compiling the native code to a binary module; and executing the compiled native code to optimize use of parallelism within one core, intra-node parallelism, and inter-node parallelism among the cluster of processing nodes.

6. A computer-implemented method comprising:

performing a top-k aggregation operation on data stored across a cluster of processing nodes, the data including a plurality of values, the top-k aggregation operation being performed to identify a subset of values in the plurality of values, the subset of values including a k quantity of values, each of the k quantity of values being greater than values from the plurality of values that are not included in the subset of values, the cluster of processing nodes comprising a plurality of computing systems associated with a database, each processing node in the cluster of processing nodes being responsible for a range of keys from a group of keys, the range of keys corresponding to a subset of data stored at each processing node, and the performance of the top-k aggregation operation comprising:

receiving, from each processing node, an approximation of each of a plurality of partial aggregation function results for data distributed across the cluster of processing nodes, the approximation of each of the plurality of partial aggregation function results comprising a lesser quantity of bits than a full value of each of the plurality of partial aggregation function results, the approximation of each of the plurality of partial aggregation function results being based on an offset shared by the group of keys for data records in the database, and the approximation of each of the plurality of partial aggregation function results being associated with a maximal error and a minimal error;

distributing, to each processing node, a global k-th highest lower bound, the global k-th highest lower bound determined by at least:
    computing a lower bound and an upper bound for the approximation of each of the plurality of partial aggregation function results, and
    generating an upper bound and a lower bound for a total sum per key of the group of keys, the generating comprising summing the lower bound and the upper bound for the approximation of each of the plurality of partial aggregation function results;
receiving, from each processing node, a full value for each of a plurality of top-k candidates, the plurality of top-k candidates being determined by at least performing, at each processing node, a reduce operation based on the global k-th highest lower bound, the performance of the reduce operation comprising discarding keys having an upper bound below the global k-th highest lower bound; and
returning a result comprising the k quantity of values, the result being determined based on the full value for each of the plurality of top-k candidates.

7. A computer-implemented method as in claim 6, wherein each partial aggregation function result is approximated by an m number of bits, and wherein the m number of bits begin at the offset.

8. A computer-implemented method as in claim 6, wherein the offset is equal to a position of a highest one-bit of all numbers within the group.

9. A computer-implemented method as in claim 6, further comprising distributing the range of keys for each processing node to the other processing nodes via personalized all-to-all messages such that each processing node receives all encoded sums for its range of keys.

10. A computer-implemented method as in claim 6, further comprising:
    translating a query into native code, the native code being optimized for inter-node parallelism
    compiling the native code to a binary module; and
    executing the compiled native code to optimize use of parallelism within one core, intra-node parallelism, and inter-node parallelism among the cluster of processing nodes.

11. A system comprising:
at least one data processor; and
at least one memory storing instructions which, when executed by the at least one data processor, result in operations comprising:
    performing a top-k aggregation operation on data stored across a cluster of processing nodes, the data including a plurality of values, the top-k aggregation operation being performed to identify a subset of values in the plurality of values, the subset of values including a k quantity of values, each of the k quantity of values being greater than values from the plurality of values that are not included in the subset of values, the cluster of processing nodes comprising a plurality of computing systems associated with a database, each processing node in the cluster of processing nodes being responsible for a range of keys from a group of keys, the range of keys corresponding to a subset of data stored at each processing node, and the performance of the top-k aggregation operation comprising:
        receiving, from each processing node, an approximation of each of a plurality of partial aggregation function results for data distributed across the cluster of processing nodes, the approximation of each of the plurality of partial aggregation function results comprising a lesser quantity of bits than a full value of each of the plurality of partial aggregation function results, the approximation of each of the plurality of partial aggregation function results being based on an offset shared by the group of keys for data records in the database, and the approximation of each of the plurality of partial aggregation function results being associated with a maximal error and a minimal error;
        distributing, to each processing node, a global k-th highest lower bound, the global k-th highest lower bound determined by at least:
            computing a lower bound and an upper bound for the approximation of each of the plurality of partial aggregation function results, and
            generating an upper bound and a lower bound for a total sum per key of the group of keys, the generating comprising summing the lower bound and the upper bound for the approximation of each of the plurality of partial aggregation function results;
        receiving, from each processing node, a full value for each of a plurality of top-k candidates, the plurality of top-k candidates being determined by at least performing, at each processing node, a reduce operation based on the global k-th highest lower bound, the performance of the reduce operation comprising discarding keys having an upper bound below the global k-th highest lower bound; and
        returning a result comprising the k quantity of values, the result being determined based on the full value for each of the plurality of top-k candidates.

12. A system as in claim 11, wherein each partial aggregation function result is approximated by an m number of bits, and wherein the m number of bits begin at the offset.

13. A system as in claim 11, wherein the offset is equal to a position of a highest one-bit of all numbers within the group.

14. A system as in claim 11, wherein the operations further comprise distributing the range of keys for each processing node to the other processing nodes via personalized all-to-all messages such that each processing node receives all encoded sums for its range of keys.

15. A system as in claim 11, wherein the operations further comprise:
    translating a query into native code, the native code being optimized for inter-node parallelism
    compiling the native code to a binary module; and
    executing the compiled native code to optimize use of parallelism within one core, intra-node parallelism, and inter-node parallelism among the cluster of processing nodes.

* * * * *